April 20, 1965   G. E. KILNER   3,179,137
FRUIT GRIPPING MEANS IN A TORQUE PITTER
Filed Sept. 12, 1962
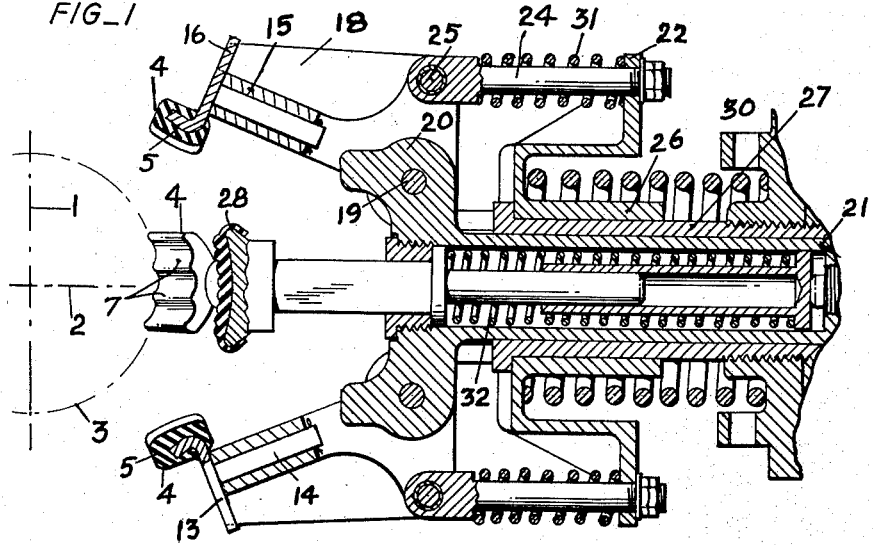
FIG_1
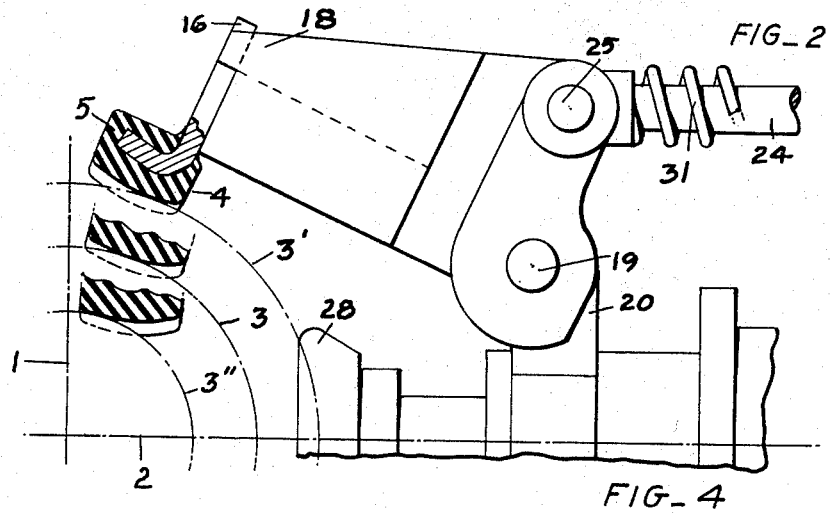
FIG_2
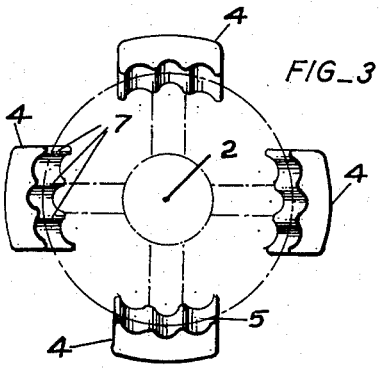
FIG_3
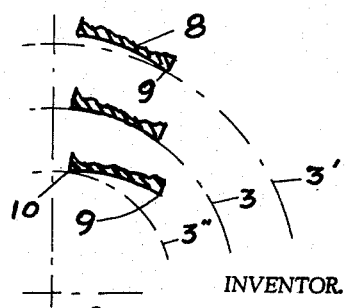
FIG_4
INVENTOR.
GEORGE E. KILNER
BY
ATTORNEYS

United States Patent Office 3,179,137
Patented Apr. 20, 1965

3,179,137
FRUIT GRIPPING MEANS IN A TORQUE PITTER
George E. Kilner, Oakland, Calif., assignor to Filper Corporation, San Ramon, Calif., a corporation of California
Filed Sept. 12, 1962, Ser. No. 223,156
5 Claims. (Cl. 146—28)

This invention relates to improvements in the fruit gripping means in a pitter of the type that is shown in United States Letters Patent No. 2,826,227 issued March 11, 1958, to Joseph Perrelli et al.

The fruit pitter disclosed in the above-mentioned patent is widely known in the fruit canning industry as a "torque" or "Filper" pitter, and is now commonly used by most canners of clingstone peaches for pitting said peaches.

The principle on which torque pitters operate is one in which the pit of a peach is gripped and held, and at the same time the body or flesh of the peach within which the pit is adhered, is also gripped separately from the pit. Then the pit and body are moved relatively about an axis common to both, thereby separating the pit from the body.

Usually the body of the peach about the pit is bisected, and each half of the body is gripped and is rotated relative to the pit. Whether the pit is rotated relative to the body, or the body is rotated relative to the pit, or whether the body of the peach or drupe, including the pit is bisected and later the pit half and the half of the body having the pit half therein are rotated relative to each other, it is essential that the body of the peach be tightly gripped at its outer convex surface.

In the torque type pitter, the outer convex surface of the peach is tightly gripped and the pit is also tightly gripped, and the means for most effectively gripping the outer surface of the peach up to the present time are separate peach engaging pads that substantially simultaneously move into tight engagement with the convex outer surface of the peach at equally spaced points therearound after such engagement is effected, and after means has moved into tight holding engagement with the pit, a torque force is applied to effect relative movement between the set of pads that are in tight engagement with the outer surface of the peach and the pit holding means, to shear the body from the pit.

One of the problems in using the torque pitting method is to grip the convex outer surfaces of different sized peaches sufficiently tight to effect an efficient separation of the body from the pit without injury to the flesh of the body.

The peach gripping pads heretofore commonly used for gripping a peach have had concave peach engaging surfaces designed to follow or to generally conform to the convex outer surface of the peach to be gripped, both in a plane normal to the axis about which the peach body is to be rotated, and in a plane in which such axis is disposed. These planes, of course, are at a right angle to each other.

It has been found that, in the normal operation of a torque pitter, there are variations in the size of the fruit being pitted that have resulted in both inefficient pitting and in injury to certain peaches.

One of the main objects of this invention is the provision of peach gripping means in a torque type pitter that is adapted to overcome the above objections, and which means enables the efficient holding or gripping of the peach bodies or halves thereof, in a pitting operation.

Another object of the invention is the provision of peach gripping means that is adapted to tightly grip the convex outer surface of a peach half having a pit adhered in the pit cavity therein with sufficient force to enable rotating such half while the pit is held, by rotation of the peach gripping means while it is in gripping relation to said peach half, irrespective of the size of the peach half, without injury to the peach half or slippage relative thereto.

Other objects and advantages will appear in the description and in the drawings.

In the drawings,

FIG. 1 is a cross sectional view taken through a peach gripping head of a torque pitter, illustrating the present invention. The peach half to be gripped is indicated in the circulating extending dot-dash line.

FIG. 2 is a fragmentary part sectional, part elevational view of a portion of the head of FIG. 1 showing one peach gripping pad and schematically showing said pad in peach engaging relation to three different sizes of fruit, the latter being indicated in arcuately extending dot-dash lines.

FIG. 3 is a semidiagrammatic, end elevational view illustrating the arrangement of the peach gripping pads relative to a peach, the latter being indicated in dot-dash line.

FIG. 4 is a schematic view showing a conventionally formed pad and its positions relative to different sized peaches.

Referring to FIG. 1 the mechanism illustrated is substantially identical to one of the two peach gripping mechanisms illustrated and described in said Patent No. 2,826,227, each of which is adapted to grip one of the two opposed halves of a peach at opposite sides of a plane corresponding to plane 1. The two mechanisms in the patent are identical, and each grips the peach half in the same manner, hence the present description of one will be adequate for both. Furthermore, insofar as the peach gripping function is concerned, it is immaterial whether there are two or only one such mechanism. The mechanism is rotatable about axis 2.

FIG. 1 shows the one mechanism spaced from the peach 3. In actual practice, a greater spacing would usually exist to facilitate positioning a peach between the mechanism of FIG. 1 and a corresponding mechanism at the opposite side of the plane 1.

There are four peach gripping members, generally designated 4, in the form illustrated (FIGS. 1, 3) and these members are equally spaced from each other about axis 2, and they area lso equally spaced from said axis.

Each member 4 comprises a pad 5 of rubber, or preferably of synthetic rubber, such as a Buna rubber or the like, having the characteristic of resilient rubber of approximately 67–70 Durometer hardness. Where the word "rubber" is used hereafter, it is intended to include synthetic rubber and like material, having the aforesaid characteristic.

Each pad 4 is elongated circumferentially of a circle concentric with axis 2. The line 3 in FIG. 3 shows such a line, which also indicates the circumference of a peach 3 to be gripped adjacent to plane 1.

The arcuate curvature of each pad 5, longitudinally of the pad, is generally developed about a radius that is preferably slightly greater than the radius of the largest peach to be pitted, so as to ensure against the ends of the pads digging into the outer surface of the fruit, and yet provide an adequate gripping surface in engagement with the body of the peach.

The contour of the peach gripping surface of each pad 5, which is the generally radially inwardly facing surface, or the surface generally directed toward axis 2, is slightly convex (FIGS. 1, 2). This surface has relatively large and widely spaced ribs 7 extending transversely of the length of each pad 5, and the outer surfaces of these ribs are convex, transversely of their lengths, while the surfaces of the pad between adjacent pairs of ribs, are concavely extending continuations of the convexly curved surfaces of said ribs. It may be noted that one of the ribs 7 is at each end of each pad 5, and the ribs are substantially equally spaced apart.

Ribs of the arrangement shown in FIGS. 1–3 will all effectively engage the outer convex surface of maximum and minimum diameter peaches and those of any intermediate diameter, and will indent themselves into the outer layer of the peach, but will not mutilate the flesh. the indentations disappear when the fruit halves are cooked.

In actual operation, as will later be explained more in detail as to structure used, these pads are supported with their convexly curved peach engaging faces directed generally radially toward the axis 2. They are then simultaneously moved generally toward said axis, after being positioned around a peach close to the plane 1, so as to tightly grip the outer surface of the peach half, at one side of said plane 1, and close to the latter. This movement of the peach gripping elements, while generally radially relative to axis 2, is preferably also toward the pit that is in the peach at the point of intersection between axis 2 and plane 1.

In FIG. 1 the dot-dash line 3 shows the peach 3 before the pads 5 have moved close to plane 1. The pads are in their open position.

In FIG. 2 one of the four pads 5 is indicated in peach engaging relation with a large peach 3'; a medium size peach 3; and a small peach 3". All three positions are shown diagrammatically in this view.

FIG. 4 illustrates a pad 8 having a conventional, concave, peach engaging surface transversely of the pad.

Except for the rib structure of the pad 5 of FIGS. 1–3 and the convexly curved peach engaging surface of pad 5, the pad 8 would be the same as pad 5. In conventional pad 8, there may be transversely extending ridges on the peach engaging surface of the pad, but in such pad they have heretofore been quite shallow, and thin, and close together compared with the ribs 7 shown in FIGS. 1–3.

From the conventional structure of FIG. 4, it is apparent that a peach of only one diameter, such as the peach indicated at 3, will have a convex contour corresponding to the transverse curvature of each pad 8. Also, when this occurs the pressure required to cause the ribs to slightly indent the flesh of the peach, is far greater than would be practical. If the peach is of large diameter, such as peach 3', one end 9 of the pad 8 will dig into the fruit, mutilating it to an objectionable degree, and if the peach, such as peach 3", is of quite a small diameter, the other end 10 will mutilate the flesh. Also, when either end edge 9 or 10 initially engages the fruit, a relatively poor gripping contact is made, and any slippage of the pads relative to the fruit will cut out a ring around the fruit half.

Referring to FIG. 2 it is seen that the peach engaging surface of each pad 5 is convexly curved transversely thereof. Thus when the outer surface of a large diameter peach 3' is engaged, a gently rounded surface will engage the outer surface of the peach and there will be a substantial area of this outer surface engaged due to the ribs 7 that will effect an indenting of the outer layer of flesh, as has been mentioned, but the flesh is not mutilated and the indents that are formed disappear in the cooked peach halves.

When the pads 5 grip a small diameter peach 3" or a medium diameter fruit 3, the same effective grip on the fruit body is effected, but without injury to the fruit.

It should be noted that the curvature of the pads 5 is relatively gradual and the longitudinally extending edges of each pad are rounded, thus avoiding any possibility of the engagement of a sharp edge of said pad with the outer surface of the fruit. In each instance the same effective, but harmless, gripping occurs.

While the particular structure employed for moving the pads is not involved in this invention, the structure substantially as shown in said Patent 2,826,227 is suitable.

In this structure the pads 5 are secured to the radially inner ends of arms 13 that extend generally radially relative to and around axis 2.

Each arm 13 is rigid on one end of a generally horizontally extending pin 14 that, in turn, is rotatably supported in a bearing 15 for limited swinging of the pad 5 to enable each pad to automatically accommodate itself to irregularities in the outer contour of the peach to be gripped by the four pads of a peach gripping head. Any suitable means, such as a projection 16 on each arm 13 freely extending into the space, radially outwardly of each bearing 15 to have said limited movement about the axis of each pin 14, while holding the pads generally in the position of FIG. 3.

This space in which each projection 16 is positioned is between the outer ends of a pair of generally horizontally extending, rigid members 18. Between the outer ends of each such pair of members, and positioned radially inwardly of each projection 16 is bearing 15 for each pin 14.

The opposite or inner ends of members 18 of each pair thereof are pivotally connected by pivots 19 with outwardly extending enlargements 20, relative to axis 2, that are on one end of a hollow, horizontally extending shaft 21. Shaft 21, in turn, is coaxial with axis 2.

When the pads 5 are in their expanded, or open position, the members 18 and bearings 15 thereon extend slightly divergently relative to each other in a direction away from pivots 19.

The outer ends of the members 18 will be swung radially inwardly toward axis 2 about pivots 19 when in closed or peach gripping positions.

Any suitable means may be employed for swinging the outer ends of members 18, radially inwardly toward axis 2, such as shown in the aforementioned patent, in which a horizontally extending rod 24 is pivotally connected at one end at 25 to each member 18 at a point radially outwardly of each pivot 19 relative to axis 2. The opposite end of each rod 24 is connected with an annular flange 22 that is concentric with axis 2 and that is carried on a sleeve 26, which sleeve, in turn, is slidable on a tubular member 27. Member 27 is slidable on said shaft 21 but is connected with said shaft by a spline so it will not rotate relative thereto.

A central fruit engaging element 28 coaxial with the shaft 21 projects from the shaft 21 to engage the side of peach 3 on axis 2 when the mechanism of FIG. 1 is moved toward the peach 3. Continued movement of the mechanism toward the peach will result in the tubular member 27 moving toward the peach while movement of the shaft 21 may be arrested with the result that sleeve 26, under the influence of a spring 30 reacting between sleeve 26 and a stop on member 27 will move toward the peach 3 thereby causing members 18 to swing about pivots 19 to carry the pads 5 into engagement with the peach 3. A spring 31 reacts between the end of each rod 24 that is adjacent to each pivot 25, and the flange 25, so that the force applied to the members 18 will be a yieldable force. Also a spring 32 within the hollow shaft 21 reacts between the means carrying the element 28 and a rigid element within shaft 21, so that the pressure of element 28 against the peach will be a yieldable pressure.

In actual practice in the machine described in the aforesaid patent, the pit of a whole peach is tightly held in a position at the point of intersection of plane 1 and axis 2, and there are a pair of the mechanisms shown in FIG. 1 at opposite sides of said plane that operate simultaneously for moving the peach gripping mechanisms toward each other, and for simultaneously moving the peach gripping pads 5 into tight engagement with the halves of the peach at opposite sides of plane 1 and relatively close to the latter.

The pit holding means (not shown) in plane 1 are preferably peach bisecting blades that bisect the flesh of the peach to the pit upon moving into holding relation to the latter.

Once the pit is held and the body of the peach around the latter is bisected to the pit, and when the pads 5 grip the peach halves, it is obvious that relative movement of the pads 5 relative to the pit about axis 2 will shear the flesh of the peach from the pit. In the machine of the type illustrated the mechanism of FIG. 1 at each side of the peach 3 is bodily rotated about axis 2 while the pit is held.

The particular feature of this invention resides in the pads 5 in a torque pitter, the pitter illustrated being one example. The important thing is that the character of the grip on the peach will be substantially the same irrespective of the size of the peach, and the fruit will not be mutilated.

I claim:

1. Fruit gripping means for tightly gripping the convex outer surface of a generally spherical fruit body at a plurality of spaced points around said body close to but at one side of a plane bisecting said body, for twisting one half of such body from the other comprising:
    (a) a plurality of adjacent pairs of fruit engaging members disposed in a common plane about and equally spaced from a central axis along a circular line concentric with said axis;
    (b) each of said members having a fruit gripping surface generally facing such axis and extending concavely circumferentially of such line and having a convexly curved contour transversely of such line, the width of each member transversely of said line including said convex gripping surface in the same direction, being equal to a substantial portion of the length of each pad circumferentially of said line, and the concave curvature of said pad longitudinally thereof being developed about a radius that is slightly greater than the radius of the maximum sized fruit to be gripped.

2. In a construction as defined in claim 1,
    (c) means supporting said members for simultaneous movement toward said axis for engagement of said fruit gripping surfaces with the convex outer surfaces of different sized fruit bodies adapted to be positioned on said axis substantially coaxial therewith.

3. In a torque type peach pitter having a plurality of peach gripping pads supported in an annular row disposed in a common plane about the axis of said row for movement in similar arcuate paths toward and away from said axis into gripping engagement with the outer convex surface of a peach on said axis, and each pad of which is elongated circumferentially of said row and formed with a concavely extending peach engaging surface generally facing said axis and extending longitudinally of said pad, the improvement that comprises,
    (a) the said peach engaging surface of each pad being convexly curved in a direction transversely of the length of each pad, said convexly curved surface being of a width equal to approximately half the length of said pad and the concave curvature of said pad being developed about a radius that is slightly greater than the radius of the maximum size peach to be gripped.

4. Fruit gripping means for tightly gripping the convex outer surface of a generally spherical fruit body at a plurality of spaced points around said body at one side of a plane bisecting said body but close to said plane, comprising:
    (a) a plurality of adjacent pairs of fruit engaging members disposed in a common plane about and equally spaced from each other and from a central axis along a circular line coaxial with said axis;
    (b) each of said members having a concavely extending fruit gripping surface of substantial length extending longitudinally of said circle and a convexly formed fruit gripping surface of substantial breadth relative to the length of each member extending transversely thereof, both of which surfaces generally face said axis; ;
    (c) said fruit gripping surfaces being formed with a plurality of spaced, convexly curved ribs extending transversely of the length of each member;
    (d) the outer surfaces of said ribs being convexly curved transversely of their lengths.

5. In a torque type pitter having a plurality of adjacent pairs of peach gripping pads supported in an annular row disposed in a common plane about the axis of said row for movement in similar arcuate paths toward and away from said axis into and away from gripping engagement with the convex outer surface of a peach positioned on said axis, each pad being elongated circumferentially of said row and formed with a concavely extending peach engaging surface generally facing said axis and extending longitudinally of each pad, the improvement that comprises:
    (a) the said peach engaging surface of each pad being of substanital width relative to the length thereof and the peach engaging surface thereof being convexly curved transversely of said length and formed with a plurality of relatively widely spaced, convexly extending ribs disposed transversely of the length of each pad;
    (b) the outer surfaces of said ribs being convex transversely of their lengths, and the surfaces between adjacent pairs of ribs being concave continuations of the said convexly curved outer surfaces of said ribs.

References Cited by the Examiner
UNITED STATES PATENTS

| | | | |
|---|---|---|---|
| 221,389 | 11/79 | Birch | 146—216 X |
| 542,231 | 7/95 | Beattie. | |
| 2,015,486 | 9/35 | Linfesty | 294—115 |
| 2,664,127 | 12/53 | Perrelli | 146—28 |
| 2,775,279 | 12/56 | Perrelli | 146—28 |

J. SPENCER OVERHOLSER, *Primary Examiner.*